UNITED STATES PATENT OFFICE 2,560,277

METHOD OF PREPARING ESTERS OF ETHER-SUBSTITUTED CARBOXYLIC ACIDS

Willard J. Croxall, Bryn Athyn, and Marian F. Fegley, Mont Clare, Pa., assignors to Rohm & Haas Company, Philadelphia, Pa., a corporation of Delaware No Drawing. Application October 2, 1948, Serial No. 52,610

6 Claims. (Cl. 260—473)

This invention deals with esters of monohydric alcohols and beta-hydrocarbon-substituted propionic and propenoic acids having as another substitutent in the beta-position an ether group corresponding to the monohydric alcohol. It concerns a process wherein a monosubstituted acetylene, $R'C \equiv CH$, $R'$ being a hydrocarbon group, is reacted in the presence of an alkaline catalyst with a normal ester, $(RO)_2CO$, of carbonic acid and a monohydric alcohol, R being the residue of said alcohol. The monohydric alcohol is characterized by being free of acidic hydrogen or groups reacting with a strong alkali and by being non-tertiary; i. e., primary or secondary.

The reaction may be represented as follows:

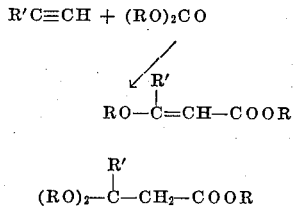

and $$(RO)_2-\overset{R'}{\underset{|}{C}}-CH_2-COOR$$

From the reaction mixture there are separable both the beta-hydrocarbon-substituted beta-ether-substituted propenoic or acrylic ester and the related ester of a di-beta-ether-substituted propionic acid.

As an alkaline catalyst, there may be used an alkali metal acetylide, an alkali metal alcoholate, or a strongly alkaline quaternary ammonium alcoholate, particularly one in which the quaternary group is free of radicals readily forming olefines from degradation by heat and in which the alcoholate group is derived from a monohydric alcohol of one to four carbon atoms.

The alkali acetylides are derivable from acetylene itself or a monosubstituted acetylene, such as methylacetylene, ethylacetylene, butylacetylene, phenylacetylene, or isopropenylacetylene, by known reactions. Examples of acetylides include both mono- and di-acetylides of acetylene, such as lithium acetylide, sodium acetylide, potassium acetylide, rubidium acetylide, cesium acetylide, disodium acetylide, dipotassium acetylide, or monohydrocarbon-substituted acetylides, such as sodium methylacetylide, sodium butylacetylide, sodium phenylacetylide, potassium methylacetylide, potassium ethylacetylide, potassium amylacetylide, potassium isopropenylacetylide, potassium phenylacetylide, potassium benzylacetylide, or sodium butylphenylacetylide. The acetylides of acetylene itself, while entirely effective as catalysts, may act as though acetylene were present to enter into the reaction to form small amounts of esters lacking the beta-hydrocarbon substituent. It is generally better, therefore, to use an acetylide corresponding to the hydrocarbon-substituted acetylide used for the reaction. Thus, when phenylacetylene is to be reacted, an alkali metal phenylacetylide may desirably, but not necessarily, be used as a catalyst.

Alkali metal alcoholates may be formed with any monohydric alcohol. Such alcohol may be primary, secondary, or tertiary, saturated or unsaturated, straight or branch-chained. Typical of alcohols which are useful are methyl, ethyl, propyl, isopropyl, butyl, isobutyl, sec.-butyl, tert.-butyl, amyl, hexyl, heptyl, octyl, nonyl, decyl, dodecyl, allyl, methallyl, crotyl, cinnamyl, benzyl, methylbenzyl, cyclohexyl, or methylcyclohexyl alcohols. The alcoholates are not confined, however, to alcohols of the formula ROH where R is a hydrocarbon group but may be any of the monohydric alcohols the non-hydroxylated residue of which does not react with a strongly alkaline hydroxide. Thus, the alcohol residue may contain such groups as ether, sulfide, or amino. As will be seen, the alcoholate group includes those used in forming the esters of carbonic acid and it is often advantageous to use an alkali metal alcoholate which corresponds to the alcohol used for the preparation of the reacting carbonate ester.

It is economically advatnageous, however, that an alcoholate be used which is derived from a lower aliphatic alcohol and that the alkali metal used have an atomic weight of at least 23. Typical of preferred alkali metal alcoholates are sodium methylate, sodium ethylate, sodium tert.-butoxide, potassium methylate, potassium ethylate, and potassium butoxide. It is generally most economical to use an alcoholate having not over four carbon atoms. These have an advantage also in being very readily prepared.

Quaternary ammonium alcoholates or alkoxides are peculiarly effective as catalysts when they contain an alkoxide group of one to four carbon atoms and are free of groups yielding olefines by degradation. In the most effective quaternary ammonium alkoxides, the alkoxide group forms one of the five N-substituents and two to four of the N-substituents are supplied by the methyl group, while the benzyl nucleous makes up any needed balance of N-substituents to form the quaternary group. The alkoxide group may be methoxide, ethoxide, propoxide, or tert.-butoxide. There may be such benzyl nuclei as methylbenzyl, ethylbenzyl, propylbenzyl, isopropylbenzyl, tert.-butylbenzyl, octylbenzyl, isooctylbenzyl, tert.-octylbenzyl, bromobenzyl, chlorobenzyl, phenylbenzyl, methoxybenzyl, ethoxybenzyl, methoxy-methylbenzyl, and the like. It is preferred that the molecular weight of the substituting groups in the phenyl ring of the benzyl nucleus be not over 120.

Typical quaternary ammonium alcoholates useful as catalysts in the process of this invention are tetramethyl ammonium methoxide, tetramethyl ammonium tert.-butoxide, trimethyl benzyl ammonium methoxide, trimethyl benzyl ammonium ethoxide, dimethyl dibenzyl ammonium methoxide, dimethyl di(chlorobenzyl) ammonium methoxide, dimethyl di(methylbenzyl) ammonium ethoxide, trimethyl methylbenzyl ammonium tert.-butoxide, trimethyl butylbenzyl ammonium tert.-butoxide, trimethyl 2,4,6,8-tetramethyloctylbenzyl ammonium methoxide, trimethyl di(isopropyl)benzyl ammonium methoxide, dimethyl di(chlorobenzyl) ammonium propoxide, etc.

There are other alkaline materials which may be taken to serve as alkaline catalysts, such as sodium or potassium metal, sodium hydride, or sodium amide. These do not usually offer particular advantage as catalysts and are promptly reacted with a monosubstituted acetylene to form in situ alkali acetylides. They may, therefore, be considered as the equivalents of the above-defined catalysts.

The proportion of catalyst to be taken may vary within rather wide limits. For instance, satisfactory results have been obtained when one mole of catalyst was used per two moles of carbonic acid ester. On the other hand, as small a proportion of catalyst as one mole of a catalyst per 80 moles of carbonic acid ester has given good results. The proportion of catalyst to ester is preferably one mole of the former to ten to twenty moles of the latter when an acetylide or alkali alcoholate is used and one mole of catalyst to 10 to 60 moles of ester when a quaternary ammonium alcoholate is used as catalyst.

Carbonic acid esters, $(RO)_2CO$, are derivable from any monohydric alcohol, ROH, the radical R of which is free of groups having freely reactive hydrogen or of groups reacting with a strong alkali. This requirement excludes from the non-hydroxylated portion of the alcohol acidic groups, such as carboxylic or sulfonic, or groups which yield an acidic function; for example, amide, ester, acid halide, anhydride, or lactone groups, the sulfhydryl or aldehyde groups or acidic hydrogen in nitro compounds.

An important subclass of esters is based on non-tertiary, monohydric alcohols in which R is a hydrocarbon group, which may be saturated or unsaturated, aliphatic, cycloaliphatic, or aralkyl, and of straight or branched chain structure, and desirably of not over twelve carbon atoms. Other important subclasses of esters are based on alcohols which have an ether linkage, thioether linkage, or an amino group.

When R represents a hydrocarbon group, it may be such a group as methyl, ethyl, propyl, isopropyl, butyl, isobutyl, sec.-butyl, amyl, hexyl, heptyl, octyl, decyl, dodecyl, octadecyl, allyl, methallyl, crotyl, undecenyl, oleyl, cinnamyl, benzyl, methylbenzyl, butylbenzyl, cyclohexyl, or methylcyclohexyl.

The group R may contain an ether linkage, as in methoxyethanol, ethoxyethanol, butoxyethanol, octoxyethanol, dodecyloxyethanol, methoxyethoxyethanol, ethoxyethoxyethanol, ethoxyethoxyethoxyethanol, phenoxyethanol, benzyloxyethanol, phenoxyethoxyethanol, allyloxyethanol, methallyloxyethoxyethanol, cyclohexyloxyethanol, ethoxypropanol, butoxypropanol, octyloxypropanol, or butoxypropoxyethanol. The ether alcohols may be summarized by the formula $$Ro(OC_nH_{2n})_xOH$$

where $x$ is a small integer, particularly one to three, $n$ is a whole number from two to three, and Ro is a hydrocarbon group, particularly one of not over twelve carbon atoms.

A different type of ether linkage is found in tetrahydrofurfuryl alcohol, which in point of fact is an interesting starting material for preparation of compounds according to this invention.

Instead of an oxygen ether alcohol, there may be used a thioether alcohol as a starting material and a carbonic acid ester made from it. Typical of sulfide-containing alcohols are ethylthioethanol, ethyl thiopropanol, butylthioethanol, butylthiopropanol, octylthioethanol, phenylthioethanol, benzylthioethanol, or cyclohexylthioethanol. Thioether alcohols having not over twelve carbon atoms are preferred.

As typical of the amino-alcohols which serve as starting materials, there may be mentioned dimethylaminoethanol, diethylaminoethanol, dimethylaminopropanol, ethylaminoethanol, aminoethanol, and dibutylaminoethanol. The preferred alcohols of this type contain a tertiary amine group and not over twelve carbon atoms.

Such alcohols serve as starting materials for preparing carbonic acid esters of the formula

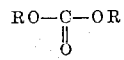

by known methods. Any of these esters may be reacted with a substituted acetylene, $R'C\equiv CH$, in the presence of an anhydrous alkaline catalyst.

The second component in the reaction, a monosubstituted acetylene, $R'C\equiv CH$, may have as the R' substituent an alkyl group such as methyl, ethyl, propyl, butyl, hexyl, octyl, or decyl or an unsaturated hydrocarbon group such as vinyl or isopropenyl, or a cyclic group such as phenyl, methylphenyl, butylphenyl, benzyl, methylbenzyl, or butylbenzyl. It is preferred that R' not exceed eleven carbon atoms in size. The substituents which at present seem of most importance are the phenyl group and aliphatic hydrocarbon groups of not over four carbon atoms, particularly the isopropenyl group and alkyl groups from methyl to butyl.

This reaction between substituted acetylene and carbonic acid ester is effected at atmospheric pressure or at reduced or increased pressures and at temperatures between 20° C. and 110° C. The preferred range of temperature is 40° C. to 90° C. The reaction may be run without or with an inert anhydrous organic solvent, such as ethyl ether, isopropyl ether, toluene, xylene, aromatic naphthas, and the like. Excess of the reacting carbonic acid ester serves as a solvent and proves often to be a particularly desirable diluent which is separable at the end of the reaction.

The preferred method of proceeding is to mix the carbonic acid ester and catalyst and add the substituted acetylene thereto with stirring. This permits satisfactory control of the reaction. When all of the substituted acetylene has been added, the reaction mixture is stirred for an additional period of time while the temperature is maintained at a level favorable for promoting and completing the reaction. The catalyst is then destroyed by addition of an acidic substance. There may be used for this purpose hydrochloric, sulfuric, acetic, or other acid. The resulting organic layer may then be washed and dried.

The neutralized reaction mixture or the washed organic layer is then subjected to fractional distillation for the recovery of reaction products. The first fractions contain alcohol and unreacted carbonic acid ester. There are then obtained fractions containing beta-ether beta-hydrocarbon-substituted acrylates and di-(beta-ether) beta-hydrocarbon-substituted propionates. These fractions may be further distilled to give pure portions of each type of ester.

For many applications, however, this is not necessary as the mixture of acrylic and propionic acid esters may be used directly as an intermediate for a number of chemical reactions. The mixture itself may also be used for plasticizing resinous materials. Again, the mixture may be treated with an acidic or basic catalyst and the di-(beta-ether substituted) propionate dealcoholated to the corresponding beta-ether-acrylate.

The following examples present typical procedures which illustrate the method of this invention.

*Example 1*

Into a two-liter, three-neck flask equipped with a reflux condenser and a gas-tight stirrer there was placed 600 ml. of anhydrous ethanol denatured according to Formula 2B. Thereto 34.5 g. of sodium was added in small pieces over a period of several hours while the mixture was stirred. After the sodium had dissolved, the excess ethanol was removed by distilling under reduced pressure and 1414 g. of diethyl carbonate was added to the dry, powdered sodium ethoxide. Distillation under vacuum was continued until 180 g. of distillate containing ethanol and diethyl carbonate had been taken off. This distillate was discarded and 180 g. of diethyl carbonate was added to the reaction mixture. This was heated to 78° C., a dropping funnel attached, and the system sealed with a mercury gauge to measure the pressure developed as alpha-methylvinylacetylene was added, 204 g. of alpha-methylvinylacetylene being added over a period of four and one-half hours. The reaction mixture was maintained at 70°–80° C. for six and one-half hours after the addition was complete. It was then cooled to room temperature and neutralized with 390 g. of 23% aqueous acetic acid. The upper layer, which separated on neutralization, was washed with 200 ml. of water. The acid and water washes were extracted with ether. The ether extract and upper oil layer were combined, dried over anhydrous potassium carbonate and fractionated to give: (a) 42 g. of ethanol-diethyl carbonate mixture, distilling at 80–84° C.; (b) 866 g. of diethyl carbonate, distilling at 126–128° C.; (c) 209 grams distilling at 79–80.5° C./2 mm., having a refractive index, $n_D^{20}$, of 1.4527 and a saponification number of 258, and consisting of three parts of 2-methyl-3-ethoxy-4-carbethoxy-1,3-butadiene and one part of 2-methyl-3,3-diethoxy-4-carbethoxy-1-butene together with one to two per cent of a ketone, 2-methyl-3-oxo-4-carbethoxy-1-butene (isopropenyl carbethoxy-methyl ketone) which can be precipitated with a semicarbazide; and (d) 213 grams of 2-methyl-3,3-diethoxy-4-carbethoxy-1-butene, distilling at 100°–101° C./1 mm. and having a refractive index, $n_D^{20}$, of 1.4518 and a saponification number of 211.

Fraction (c) was converted to pure 2-methyl-3-ethoxy-4-carbethoxy-1,3-butadiene, having a boiling point of 85° C./3 mm., a refractive index $n_D^{20}$, of 1.4699, a density, $$d_{20}^{20}$$

of 0.9833, and a saponification number of 302 when refluxed in toluene solution in the presence of sodium hydrogen sulfate. The calculated saponification number for this compound is 304. The 2-methyl-3-ethoxy-4-carbethoxy-1,3-butadiene was converted by hydrogenating with Raney nickel at 50°–60° C. to the known 2-methyl-3-ethoxy-4-carbethoxy-butane, having a boiling point of 81°–81.5° C./10 mm., a refractive index, $n_D^{20}$, of 1.4179, and a saponification number of 295.

Fraction (d) was hydrolyzed to ethyl-3-oxo-4-methyl-5-ethoxy-pentanoate by being gently warmed with a 2% aqueous hydrochloric acid solution. While it was allowed to stand with 15% hydrochloric acid, it was converted to methyl isopropenyl ketone.

Fraction (d) upon being heated in toluene in the presence of sodium hydrogen sulfate was converted to pure 2-methyl-3-ethoxy-4-carbethoxy-1,3-butadiene.

*Example 2*

Into a one-liter, three-neck flask equipped with a gas-tight stirrer with blades made of Nichrome wire, there was placed 250 ml. of anhydrous ethanol denatured with 2% of benzene. To the stirred ethanol, 11.5 g. of ¼ inch cubes of sodium was added over a period of one hour. After the sodium had dissolved, the excess ethanol was removed by distilling under reduced pressure. Four hundred seventy-two grams of anhydrous diethyl carbonate was added to the dry, powdered sodium ethoxide. Distillation under vacuum was continued until 76 g. of distillate was obtained. This distillate, containing ethanol and diethyl carbonate, was discarded and an additional 76 g. of diethyl carbonate added to the reaction mixture.

The flask was then fitted with a dropping funnel. The stirred mixture was heated to 70° C. and 102 g. of phenylacetylene added over a period of two hours. The mixture was maintained at 70°–80° C. for five hours and then cooled to room temperature.

While stirring was continued, there was added dropwise 130 g. of 23% aqueous acetic acid, whereupon two layers developed. The upper oil layer was separated and the water layer extracted with ether. The combined oil and ether extract was dried over anhydrous potassium carbonate and distilled to give the following fractions: (a) 55 grams, distilling at 70°–92° C./atm., consisting of ethanol chiefly with some diethyl carbonate and ether; (b) 275 grams, distilling at 124°–128° C./atm., consisting of diethyl carbonate; (c) 76 grams, distilling at 117°–119° C./4 mm. and having a refractive index, $n_D^{21}$, of 1.5048, a saponification number of 238; and (d) 103 grams, distilling at 99°–104° C./1 mm. and having a refractive index, $n_D^{21}$, of 1.5160 and a saponification number of 242.

Fractions (c) and (d) consisted of a mixture of ethyl beta-phenyl-beta-ethoxyacrylate and ethyl beta-phenyl-beta,beta-diethoxypropionate. Fractions (c) and (d) were combined and heated at 185° C. for three hours. Ethanol was distilled off during this process and ethyl beta-phenyl-beta-ethoxyacrylate of refractive index, $n_D^{20}$, 1.5320 and saponification number 255 was obtained by distillation of the remaining material which is entirely ethyl beta-phenyl-beta-ethoxyacrylate.

Repetition of the above preparation with substitution of hydrochloric acid for acetic for neutralization leads to identical end-products.

*Example 3*

Into a one-liter, three-neck flask equipped with a reflux condenser and gas-tight stirrer with blades of Nichrome wire, there was placed 230 ml. of anhydrous ethanol denatured with benzene. To the stirred ethanol, 9 grams of sodium cut in small cubes was added over a period of approximately one hour. After the sodium had dissolved, the excess ethanol was removed by distilling under reduced pressure. Three hundred eighty grams of diethyl carbonate was added to the dry, powdered sodium ethoxide and the distillation under reduced pressure continued until 50 g. of distillate was obtained. The distillate, containing ethanol and diethyl carbonate, was discarded and an additional 50 grams of diethyl carbonate was added to the reaction mixture.

The flask was fitted with a dropping funnel. The stirred reaction mixture was heated to 75° C. and 62 g. of butylacetylene, 1-hexyne, was added over a period of one hour. The mixture was maintained at 70°–80° C. for four and one-half hours and then cooled to room temperature. While the stirring was continued, the mixture was neutralized with 130 grams of 23% aqueous acetic acid, whereupon two layers formed. The upper layer was separated, washed with 100 ml. of water, combined with the ether extract from the acid and water washes, and dried over anhydrous potassium carbonate. On fractionation, the dried material yielded (a) unreacted butylacetylene distilling at 58°–62° C.; (b) ethanol distilling at 75°–82° C.; (c) diethyl carbonate distilling at 126°–128° C.; and (d) a fraction distilling at 80°–87° C./2–4 mm., having a refractive index, $n_D^{20}$, of 1.4492 and a saponification number of 253. Fraction (d) is a mixture of 51 per cent of ethyl beta-butyl-beta,beta-diethoxypropionate and 49 per cent of ethyl beta-butyl-beta-ethoxyacrylate.

*Example 4*

Into a two-liter, three-neck flask equipped with a gas-tight stirrer, there was placed 0.3 g. of ferric nitrate and approximately 800 ml. of liquid ammonia. One gram of sodium was added in several small pieces and air bubbled through the mixture while it was stirred until the blue color was discharged. There was then added 10.5 grams of sodium in small pieces and stirring was continued until the gray color of the reaction mixture indicated that the sodium had been converted to sodamide. Thereupon 51 g. of phenylacetylene was added dropwise. A soda lime tube was attached and the liquid ammonia allowed to evaporate. When the residue appeared dry and no ammonia bubbled through a mercury-filled U tube attached to the outlet, a vacuum was applied to draw out the remaining ammonia. Diethyl carbonate in an amount of 590 grams was added. The reaction mixture was cooled in an ice-bath until the exothermic reaction subsided and then heated to 80° C. Phenylacetylene (204 grams) was added dropwise to the stirred mixture while the temperature was maintained at 70°–80° C. After the addition was complete, the reaction mixture was maintained at 70°–75° C. for ten hours. The cooled mixture was neutralized with 130 grams of 23% aqueous acetic acid, whereupon two layers separated. The oil layer was washed with 200 ml. of water and the acid and water washes extracted with ether. The combined ether extracts and oil layer was dried over anhydrous potassium carbonate. Fractional distillation yielded the following major fractions: (a) 25 g. of ethanol distilling at 78°–80° C.; (b) 286 g. of diethyl carbonate distilling at 126°–129° C.; (c) 75 g. of a mixture consisting of 69% of ethyl beta-phenyl-beta-ethoxyacrylate and 31% of ethyl beta-phenyl-beta,beta-diethoxypropionate distilling at 135° C./2 mm. and having a refractive index, $n_D^{20}$, of 1.5202 and a saponification number of 241; and (d) 370 grams consisting of 98% of ethyl beta-phenyl-beta-ethoxyacrylate and 2% of ethyl beta-phenyl-beta,beta-diethoxypropionate, having a refractive index, $n_D^{20}$, of 1.5274 and a saponification number of 254. The overall yield is 82.6% based on the phenylacetylene used, 41.3% based on the diethyl carbonate used, and 41.3% on the sodium.

*Example 5*

Into a five hundred-milliliter, three-neck flask equipped with a gas-tight stirrer, there was placed 85 grams of a solution of trimethyl benzyl ammonium methoxide in methanol. The excess methanol was removed from the stirred mixture by distilling under vacuum for one hour. To the remaining 44 grams of trimethyl benzyl ammonium methoxide containing one equivalent of methanol there was added 169 grams of dimethyl carbonate and 24 grams of methyl methoxyacrylate. While the reaction mixture was cooled to maintain the temperature of the stirred mixture below 45° C., 51 grams of phenylacetylene was added dropwise. The mixture was stirred for two hours after the addition was complete and then neutralized with 55 grams of 23% aqueous acetic acid, whereupon two layers separated. The oil layer was drawn off and the water layer extracted with several portions of ether. The combined ether extract and oil were dried over anhydrous potassium carbonate and distilled to give the following major fractions: (a) 83 grams of dimethyl carbonate; (b) 24 grams of a mixture of methyl beta,beta-dimethoxypropionate and methyl beta-methoxyacrylate, distilling at 32°–34° C./1 mm. and having a refractive index, $n_D^{20}$, of 1.4177; (c) 57 grams of a mixture of methyl beta - phenyl - beta,beta - dimethoxypropionate (80%) and methyl beta-phenyl-beta-methoxyacrylate (20%), distilling at 81°–86° C./1 mm. and having a refractive index, $n_D^{20}$, of 1.5048 and a saponification number of 258; and (d) 33 grams of a mixture of methyl beta-phenyl-beta, beta-dimethoxypropionate (33%) and methyl beta-phenyl-beta-methoxyacrylate (67%), distilling at 84°–105° C./1 mm. and having a refractive index, $n_D^{20}$, of 1.5305 and a saponification number of 278.

The reaction of a hydrocarbon-substituted acetylide, R'C≡CH, and an ester, (RO)₂CO, in the presence of an alkaline catalyst yields products of the formula

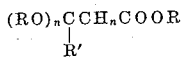

where $n$ is an integer from one to two, R is the residue of a non-tertiary monohydric alcohol, which residue does not react with strong alkali, and R' is a hydrocarbon group, particularly one of not over eleven carbon atoms. When $n$ has a value of one, the compounds formed may be represented

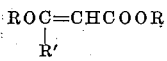

When $n$ has a value of two, the compounds have the formula

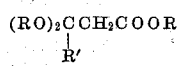

*Example 6*

In a three-liter, three-neck flask fitted with a sealed stirrer there was placed 349 grams of a 57.2% solution of benzyl trimethyl ammonium ethoxide in ethanol. The temperature of the solution was held at 40°–43° C. under reduced pressure while excess alcohol was stripped off. There was obtained 221 grams of benzyl trimethyl ammonium ethoxide with one mole of alcohol of solution. Thereto was added 1675 grams of diethyl carbonate and the flask was fitted with a reflux condenser, thermometer, and dropping funnel. A T-tube connected the dropping funnel and condenser to a mercury-filled manometer to make a closed system. There was then added dropwise over a period of a half-hour 250 grams of redistilled alpha-methylvinyl acetylene while the reaction mixture was held at 38°–42° C. by external cooling. Evolution of heat continued for about 45 minutes and the reaction mixture was stirred for another two and a quarter hours.

The reaction mixture was neutralized with dilute acetic acid. The oil layer which formed was separated, washed with water, and dried over anhydrous potassium carbonate. The dried oil was fractionally distilled. There were recovered 34 grams of ethyl alcohol and 1289 grams of diethyl carbonate. A fraction of 288.5 grams was obtained at 52° C./8 mm. to 90° C./0.6 mm. which had a refractive index, $n_D^{20}$, of 1.4590 and corresponded in composition to

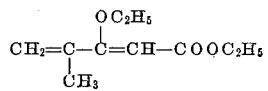

Another fraction of 108 grams was obtained at 91°–93° C./0.6 mm. which had a refractive index, $n_D^{20}$, of 1.4520 and corresponded in composition to

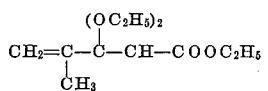

There was also obtained 170 grams of material distilling at 80° C./0.25 mm. to 212° C./2 mm. There remained 61 grams of a brittle residue.

We claim:

1. The process of preparing esters of the formula

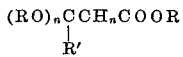

which comprises reacting between 20° and 110° C. in the presence of an alkaline catalyst a substituted acetylene, $R'C\equiv CH$, and an ester of carbonic acid and a monohydric alcohol, $(RO)_2CO$, R' being a member of the class consisting of alkyl groups of not over four carbon atoms, vinylidene groups of two to three carbon atoms, and the phenyl group, R being an alkyl group of not over two carbon atoms, $n$ being an integer from one to two, and said catalyst being a member of the class consisting of (a) alkali metal acetylides, (b) alkali metal alcoholates in which the alcohol residue is that of a saturated aliphatic monohydric alcohol of not over four carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

2. The process of preparing beta-ether esters of the formula

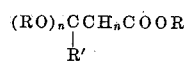

which comprises reacting within the range of 40° to 90° C. in the presence of an alkaline catalyst a substituted acetylene, $R'C\equiv CH$, and an ester of carbonic acid and a monohydric alcohol, $(RO)_2CO$, destroying said catalyst in the reaction mixture, and separating therefrom said beta-ether esters, R' being a member of the class consisting of alkyl groups of not over four carbon atoms, vinylidene groups of two to three carbon atoms, and the phenyl group, R being an alkyl group of not over two carbon atoms, $n$ being an integer from one to two, and said catalyst being a member of the class consisting of (a) alkali metal acetylides, (b) alkali metal alcoholates in which the alcohol residue is that of a saturated aliphatic monohydric alcohol of not over four carbon atoms, and (c) quaternary ammonium alcoholates in which an alkoxide group of one to four carbon atoms is one of the five N-substituents, two to four of the N-substituents are supplied by the methyl group, and the benzyl nucleus makes up any needed balance of the five N-substituents.

3. The process of preparing beta-ether esters of the formula

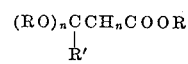

which comprises reacting between 40° and 90° C. in the presence of an alkali metal acetylide as catalyst a substituted acetylene, $R'C\equiv CH$, and an ester of carbonic acid and a monohydric alcohol, $(RO)_2CO$, destroying the catalyst in the reaction mixture, and separating therefrom a beta-ether ester, R' being an alkyl group of not over four carbon atoms, R being an alkyl group of not over two carbon atoms, and $n$ being an integer from one to two.

4. The process of preparing beta-ether esters of the formula

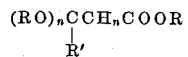

which comprises reacting between 40° and 90° C. in the presence of a benzyl trimethyl ammonium alkoxide as catalyst, said alkoxide group containing not over four carbon atoms, a substituted acetylide, $R'C\equiv CH$, and an ester of carbonic acid and a monohydric aliphatic alcohol, $(RO)_2CO$, destroying the catalyst in the reaction mixture, and separating therefrom a beta-ether ester, R' being a vinylidene group of two to three carbon atoms, R being an alkyl group of not over two carbon atoms, and $n$ being an integer from one to two.

5. The process of preparing beta-ether esters of the formula

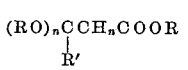

which comprises reacting between 40° and 90° C.

in the presence of an alkali metal alkoxide as catalyst, in which the alkoxide group contains not over four carbon atoms, a substituted acetylene, R'C≡CH, and an ester of carbonic acid and a monohydric aliphatic alcohol, $(RO)_2CO$, destroying the catalyst in the reaction mixture, and separating therefrom a beta-ether ester, R' being a vinylidene group of two to three carbon atoms, R being an alkyl group of not over two carbon atoms, and $n$ being an integer from one to two.

6. The process of preparing a beta-ether ester of the formula

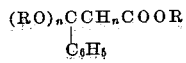

which comprises reacting between 40° and 90° C. in the presence of a benzyl trimethyl ammonium alkoxide as catalyst, in which the alkoxide group contains not over four carbon atoms, phenylacetylene and an ester of carbonic acid and a monohydric aliphatic alcohol, $(RO)_2CO$, destroying the catalyst in the reaction mixture, and separating therefrom a beta-ether ester, R being an alkyl group of not over two carbon atoms and $n$ being an integer from one to two.

WILLARD J. CROXALL.
MARIAN F. FEGLEY.

No references cited.